United States Patent [19]
Jurentkuff

[11] 3,774,308
[45] Nov. 27, 1973

[54] PROTRACTOMETER

[76] Inventor: Jerold Jurentkuff, 420 N. 21st St., Camp Hill, Pa. 17011

[22] Filed: Mar. 16, 1972

[21] Appl. No.: 235,175

[52] U.S. Cl. ................................. 33/75 R, 33/138
[51] Int. Cl. ............................................ B43l 13/00
[58] Field of Search ................... 33/75, 26, 27 C, 33/138, 137, DIG. 1, 139, 140, 1 LE

[56] References Cited
UNITED STATES PATENTS

| 1,638,914 | 8/1927 | Brush | 33/76 R |
| 3,066,416 | 12/1962 | Gutting | 33/1 LE |
| 3,399,458 | 9/1968 | Holder | 33/75 R |
| 3,407,507 | 10/1968 | Brubaker | 33/137 R |
| 3,093,919 | 6/1963 | Holtz | 33/DIG. 1 |

FOREIGN PATENTS OR APPLICATIONS

| 1,473,242 | 2/1967 | France | 33/138 |
| 298,096 | 9/1919 | Germany | 33/75 R |
| 470,745 | 4/1952 | Italy | 33/75 R |

Primary Examiner—Harry N. Haroian
Attorney—John W. Malley et al.

[57] ABSTRACT

A drafting instrument including an angulation device which is located by use of a reticle and oriented by use of a protractor and to which is pivotally connected a scaling device. The scaling device includes an extendable scaling tape which is carried in a tape dispenser under the tension of a spring motor. Both the angulation device and the scaling device may be associated with elements fabricated of magnetic material which enable fixing either device to a drafting surface which also includes magnetic material.

5 Claims, 4 Drawing Figures

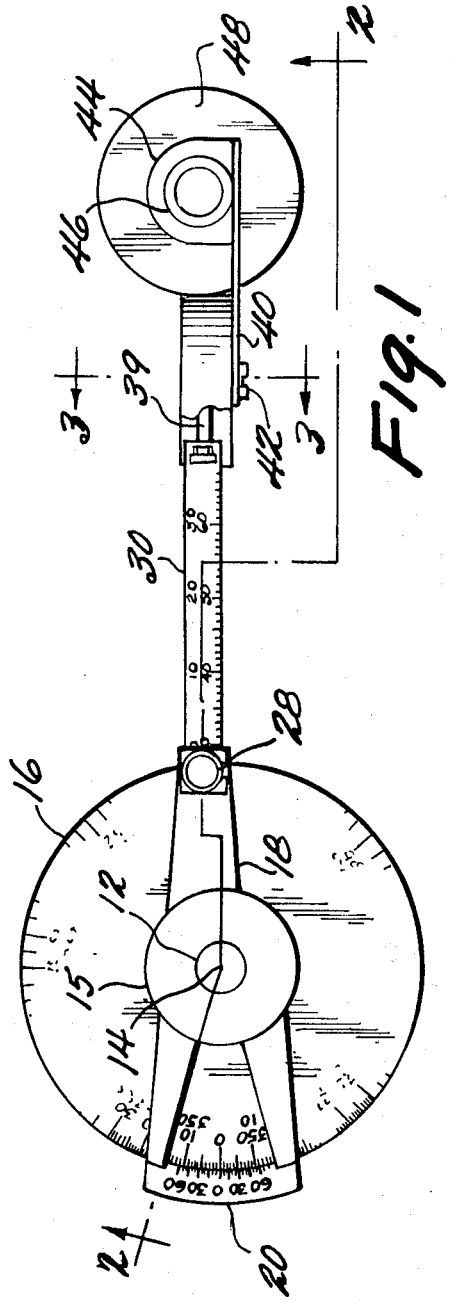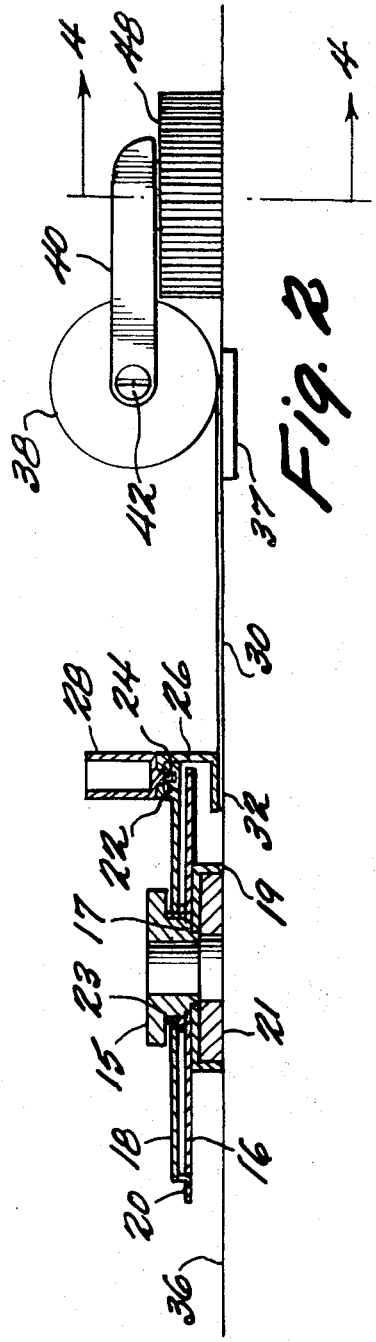

PROTRACTOMETER

BACKGROUND OF THE INVENTION

1. Field of the Invention

The present invention relates to drafting instruments or layout tools and more particularly to tools for laying out and/or drafting a plurality of points or lines each referenced to a common point and common angular orientation. Sample uses include the mechanical resolution of survey data, topographic data plotting, planimetric drawing and data plotting and triangulation.

2. Description of the Prior Art

Drafting instruments are known for laying out and/or drawing a plurality of points or lines referenced to a common origin and common angular orientation. An example of such instruments is found in the U.S. Pat. to Barker, No. 3,269,015 issued Aug. 30, 1966. A layout instrument illustrated in the drawings of the Barker patent includes a short arm 11 and a longer arm 10 which are connected at pin 13 to rotate about that pin. Each of the arms is marked with scale indicia and each supports a tape dispenser, i.e., 21 and 28 which include tapes which are marked with scale indicia to form extensions of the indicia on the arms. In addition, each of the arms is slotted to provide an edge so that plotting or drawing can be done from the end of either arm to within an inch of the centering pin. The angular orientation of the arms with respect to one another may be determined from or set by use of a protractor which is integral with one of the arms. In order to draw a pair of lines at a given angular relation to one another a pointer on arm 11 is set with respect to the protractor on arm 12 and then a thumbscrew is turned to lock the arms together. Lines may then be drawn along the above-described edges of the arms and their tapes.

While the Barker instrument is the latest advance in this area of the drafting art known to the applicant, it, nevertheless, has certain inherent drawbacks. For example, the Barker instrument has two arms and two scaling tapes contained in separate dispensers to be coordinated during operations. Further, the two arms are held with respect to each other by use of a lock which, if not secured properly, permits slippage and, thus, error in the layout or drafting of angularly related points or lines. Furthermore, only certain angles are defined on the protractor of the Barker instrument and, thus, only certain angular orientations of the arms can be established. There is no means shown in the Barker instrument for providing vernier correction to the angular setting. In addition, there is no means shown in the Barker disclosure for locating either arm with respect to a fixed point other than by use of the centering pin which cannot be easily accurately registered upon a point.

Yet another disadvantage of the Barker instrument is that a single scale is inscribed on each of the arms and, thus, use of only an equivalent scale in the tapes is practical. Moreover, no means is disclosed in the Barker patent for easily exchanging these tapes for others. Furthermore, only distances to the scribing pins register directly, others must be determined by adding extendable scale values to fixed scale values. In addition, no means is disclosed in the Barker patent for exchanging the protractor of the instrument for another.

Finally, when the Barker instrument is being utilized as a drafting instrument, it is held in place by means of scribing pins 33 and 25 as well as the centering point. Not only do these points leave indentations on the surface of the drafting paper and board, but also they support the tape only at its ends, thus permitting bending of the tape subjected to lateral force during drafting. The possibility of bending is enhanced because the scribing points raise the tape above the drafting surface.

SUMMARY OF THE INVENTION

The applicant's invention, the protractometer, is designed to overcome the disadvantages of the prior art, such as the Barker instrument discussed above. The applicant's protractometer comprises two devices, one of which includes a hub having a sighting shaft with a reticle for locating the device with respect to a given point and about which is arranged a protractor which may be oriented with respect to a given direction as, for example, north. A beam rotatably mounted about the hub includes a vernier scale at one end to cooperate with a protractor scale formed upon a plate also rotatably mounted about the hub to give an indication of rotation from the orientation direction in degrees and minutes. A measuring tape, a part of the second device, is releasably attached to the second end of the vernier beam so that the distance from the reticle center to any other point on the drafting surface may be determined. The point on the drafting surface may be determined. The bases of both devices, the scaling type, and the drafting surface may be formed of magnetic material to provide a nonpuncturing fastening of the protractometer to said drafting surface.

BRIEF DESCRIPTION OF THE DRAWINGS

The preferred embodiment of the invention will now be described with reference to the drawings in which:

FIG. 1 is a top view of the protractometer; while

FIG. 2 is a side view in partial section along line 2—2 shown in FIG. 1.

DETAILED DESCRIPTION OF THE PREFERRED EMBODIMENT

Figure 3:
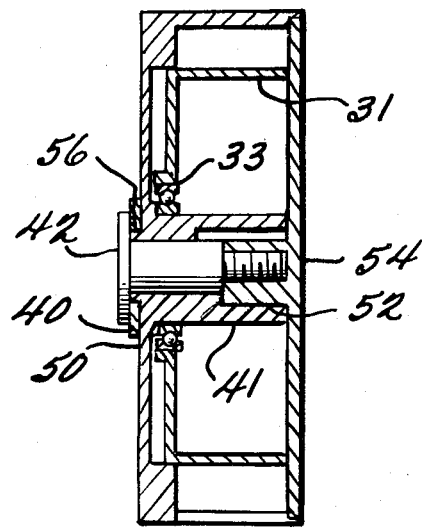
FIG. 3 is a cross sectional view taken along line 3—3 shown in FIG. 1.
Figure 4:
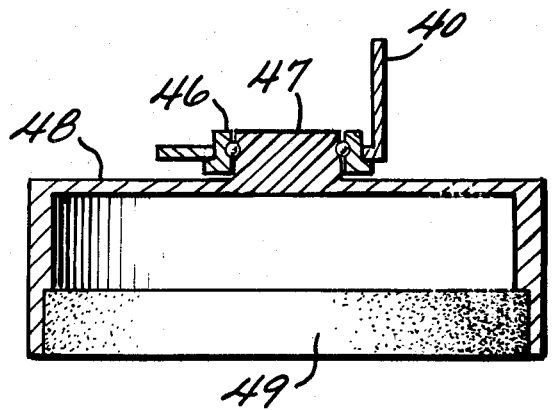
FIG. 4 is a cross sectional view along the line 4—4 shown in FIG. 2.

The protractometer comprising an angulation and a scaling device is shown generally in FIG. 1. The angulation device includes a central shaft 12 of transparent material which includes an axially aligned reticle 14 by which the device may be located over any given point. A locating knob 15 which is knurled on its outer surface receives shaft 14 in a forced fit. A protractor scale marked in degrees is arranged on plate 16 which is removably mounted on a journal of knob 15 and is rotatable thereabout. The indicia of the protractor may be painted, stamped or marked otherwise upon the plate 16. The knob 15 includes a threaded portion 17 which mates with a threaded portion on the externally knurled flux guide 19. Flux guide 19, in turn, encloses permanent magnet 21 and directs its magnetic flux toward drafting surface 36 upon which the guide rests. This permanent magnet then cooperates with a magnetic sheet 37 disposed beneath surface 36 to provide a nonpuncturing attachment of the angulation device to said surface. Sheet 37 may comprise either a material permanently magnetized or a material magnetizable by use of an electric current which may be used in conjunction with said material.

The plate 16 is so mounted on knob 15 to provide sufficient friction between said parts to prevent accidental rotation of the plate but at the same time to permit easy orientation of is protractor. Thus, once reticle 14 has been located over a reference point, the zero degree mark of the protractor scale on plate 16 can be aligned with any reference direction by rotating said plate.

The knob 15 rotatably supports a vernier beam 18 on ball bearing roll 23 in a plane above and parallel to that of plate 16. Vernier beam 18, as best seen in FIG. 2, includes a lip 20 disposed adjacent to the plate 16. The lip 20 includes a double vernier scale which is arranged to cooperate with the scale on plate 16 to provide an accurate indication of angular orientation in degrees and minutes.

The end of vernier beam 18 opposite to that supporting lip 20 includes an aligning anvil 22 which includes a threaded aperture 24, for receiving a threaded portion of tape anchor thumbscrew 28. The anvil 22, as is seen in FIG. 2, has a beveled surface which mates with that of the tape anchor 26 of the scaling device. Said tape anchor is slotted so to enable sliding it laterally onto or from anvil 22 without completely removing screw 28. Thus, screw 28 protrudes through the tape anchor 26 and into the aligning anvil 22 to releasably attach a tape anchor 26 to the vernier beam 18.

Tape anchor 26 provides an anchor for one end of the exchangeable scaling tape 30 which may be imprinted with any convenient scale, for example, any one of the six standard engineering scales: 10, 20, 30, 40, 50 or 60 divisions per inch. Each tape, about 36 inches in actual extended length, is marked with a scale whose hypothetical zero mark occurs at reticle center 14 and an auxilliary scale whose zero mark occurs near the end of the tape. The auxilliary scale, 1 ½ inches in actual length, enables measuring from a reference point to any point which would lie beneath the angulation device if centered over said reference point. Anchor 26 includes a flange 32 which is parallel and tangent to the drawing surface and to which one end of tape 30 is affixed and thereby maintained contiguous to the drawing surface 36 so that a line may be easily drawn along the edge of the tape. Since tape 30 is made of steel or other suitable magnetic material, it can be attracted to the magnetic sheet 37 which may be either permanently or temporarily magnetized. Thus, the tape 30 can resist bending caused by lateral force during drafting to provide a stable straight line. In addition, the underside of tape 30 may be roughened or otherwise treated to frictionally resist drafting forces.

That portion of tape 30 which is not extended for use is contained in the tape drum 50 under the action of a spring motor 39 which is contained within a spring retainer 31 also contained within drum 50. The end of tape 30 which is attached to spring motor 39 is detachable therefrom so that different tapes can be applied to the same spring motor.

Spring retainer 31 provides maximum efficiency of the spring motor by restricting said motor to the least space which enables its entire length to contribute to winding capacity. The spring retainer is mounted on ball bearing roll 33 which serves to minimize the friction differential caused by the alternately combining and opposing forces exerted by the spring motor and scaling tape on said retainer during operation. Ball bearing roll 33 is removably mounted on spindle 41 which is integral with tape drum 50. The inner end of the spring motor is anchored to said spindle which includes a cavity to receive nut 52 which is integral with tape drum cover 54. Tape drum 50 includes an unthreaded hole along the axis of its spindle through which assembling screw 42 is passed and screwed into nut 52 of the tape drum cover to effect assembly of the tape dispenser 38 and attachment of said dispenser to cantilever beam 40. A lug 56 which is integral with tape drum 50 and which includes said unthreaded hole mates with an aperture in the free end of the cantilever beam to position said dispenser and prevent its rotation.

The cantilever beam 40 is integral with a plate 44 which is mounted on ball bearing roll 46 which, in turn, is mounted on hub 47 to provide rotation thereabout of said plate and cantilever beam. The hub 47 is integral with an externally knurled flux guide 48 which encloses cylindrical permanent magnet 49 and guides the flux therefrom toward the drafting surface 36 and magnetic sheet 37. Thus, the permanent magnet 49 disposes tape dispenser 38 so that the emerging portion of tape 30 is maintained horizontal and contiguous to the drawing surface. Thus, tape 30 is held flatly against the drafting surface over its entire extended length during operation.

The operation of the above-described protractometer should be apparent from its structure. It is, however, important to note that an operator with one manipulation, i.e., by sliding the scaling device over the drafting surface, can set both the angular orientation and distance of a point or line with respect to the protractor 16 and the reticle 14. A point to be plotted or line to be drawn lies along the graduated edge of the scaling tape 30 properly oriented. It is also important to note that the tape 30 may be easily replaced either by attaching a new tape dispenser 38 to cantilever 40 or by attaching a new tape 30 to the spring motor 39 within the existing dispenser 38 and thus a plurality of scales may be utilized with the protractometer.

In the latter case the outer end of spring motor 39 may be symmetrically notched near its outer end to form opposed lugs which can then be passed through an aperture in the end of tape 30 and folded thereover to effect attachment or unfolded to effect detachment.

Another important flexibility in operation which is available through the protractometer construction is that the knob 15 on which protractor 16 is mounted may be unscrewed from the flux guide 19 so that plate 16 may be replaced with another more convenient differently numbered plate.

Finally, it is important to note that one setting of the hub 14 and protractor 16 suffices to layout any number of points or lines on the drafting paper since the scaling tape 30 is sufficiently long to enable plotting or drawing from any point to any other point on a standard size sheet of drafting paper.

While the above description fully covers the preferred embodiment, it is important to note that many modifications to this embodiment are within the scope of the invention. Thus, the scope of the invention must be ascertained by the following claims.

What is claimed is:

1. A layout apparatus comprising a sighting hub having a reticle for locating said layout apparatus with respect to a given point and a protractor scale removably mounted on said hub for orienting said layout apparatus with respect to a given direction and a beam pivotally mounted upon said hub and having an indicating means disposed to cooperate with said protractor scale to provide a reading of the orientation of said beam with respect to said given direction, an anchoring means including a thumbscrew and anvil by which to align and releasably affix one end of an extendable scale means to said beam to provide a direct reading of the distance from said reticle to a point along said scale means, magnetic means attached to the base of said apparatus for affixing the apparatus to a magnetic drafting surface and second apparatus pivotally connected to the second end of said scale means, said second apparatus including spring means for applying tension to said tape to enable straight-line alignment of the reticle center and graduated edge of the scaling tape and a spring retaining means to insure maximum efficiency of said spring motor and a bearing means to provide a nearly constant rate of change in the varying tensile force applied to the tape during operation.

2. The second apparatus of claim 1 further including magnetic means attached to the base of said apparatus for affixing the second end of said scale means to a magnetic drafting surface.

3. The apparatus of claim 1 wherein said scale means comprises a tape formed of magnetizable material, e.g., steel, having scale indicia formed thereupon and a bottom surface either roughened or otherwise treated to increase its coefficient of friction.

4. The apparatus of claim 1 wherein said scale means is removably affixed to said second apparatus so that a plurality of tapes may be utilized with said second apparatus.

5. The apparatus of claim 1 wherein said indicating means comprises a vernier scale formed upon a lip at one end of said beam.

* * * * *